June 27, 1933.  H. MOORE  1,915,746
DEPHLEGMATOR OR BUBBLE TOWER
Filed April 20, 1931
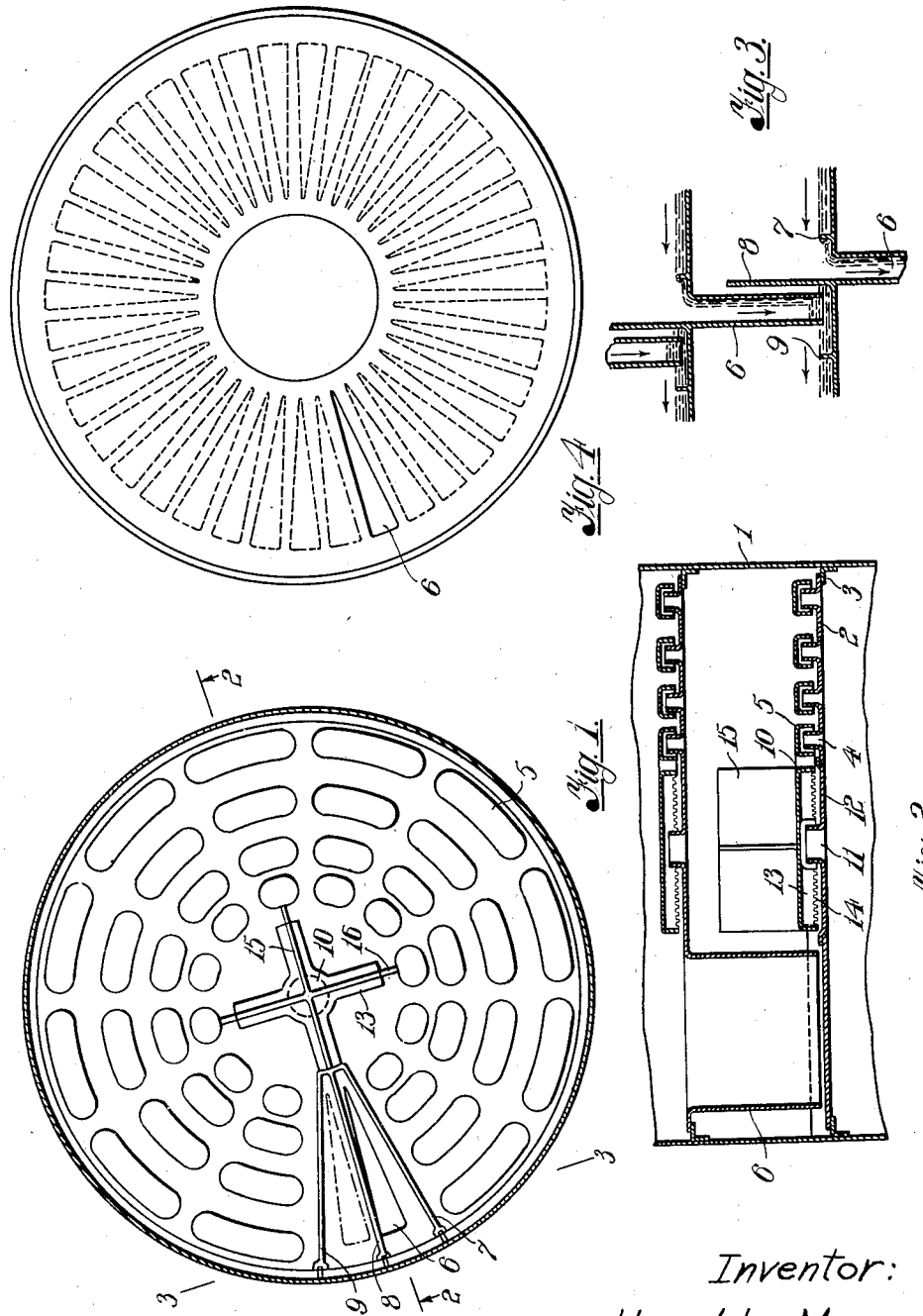
Inventor:
Harold Moore
By: Frederick S. Chafer
his Attorney.

Patented June 27, 1933

1,915,746

UNITED STATES PATENT OFFICE

HAROLD MOORE, OF LONDON, ENGLAND, ASSIGNOR TO JENKINS PETROLEUM PROCESS COMPANY, OF CHICAGO, ILLINOIS, A CORPORATION OF WISCONSIN

DEPHLEGMATOR OR BUBBLE TOWER

Application filed April 20, 1931, Serial No. 531,531, and in Great Britain May 19, 1930.

This invention relates to dephlegmating columns or bubble towers used for such purposes as fractional distillation, condensation, the stripping or separation of gases by liquids or for other purposes and more particularly to columns or towers of the kind which are fitted with a series of superimposed trays or baffles through the liquid on each of which gases or vapours under treatment are caused to bubble.

In order that the liquid passing over one tray shall take as long a path as possible before passing to the tray next below it and thus facilitate intimate contact between the gases of vapours and the liquid, the trays have in some previous constructions been fitted with guide plates or baffles which force the liquid to flow in a spiral or tortuous path in its passage over the surface of each tray, the down pipes through which the liquid descends being placed alternately at opposite sides of the column or alternately at the centre and at the circumference of the column.

It has also been proposed in distilling apparatus suitable for the treatment of ammoniacal liquors and having a central vertically extending lime chamber or decomposing chamber surrounded by narrow annular distilling cells fitted with bells or hoods through which steam is bubbled through the ammoniacal liquor, to arrange for the liquor covering the bottom of the uppermost cell to overflow through a tube into the next cell below and so on through all the cells in series in such a way that the stream of liquor must in each separate cell make one substantially complete circuit round the central lime chamber and is then brought into intimate contact with the steam issuing through the bells or hoods.

The object of the present invention is to provide an improved construction and arrangement applicable to dephlegmating columns or bubble towers designed to ensure complete and intimate contact between the gases or vapours and liquid and also to ensure regular temperature differences between a portion of each individual tray and the corresponding portion of the trays vertically above and below it.

According to the present invention the liquid descending a dephlegmating or bubble tower is compelled to make one substantially complete circuit around the centre of each of a number of superimposed trays or baffles in the form of a broad stream which covers substantially the whole of the cross sectional area of the tower and through which the gases or vapours under treatment are caused to bubble at points distributed both radially and circumferentially over the surface of the tray.

In the preferred construction according to the invention each of a number of trays disposed at spaced intervals in the height of the tower is provided with radial liquid inlet and outlet passages separated by a baffle to compel the liquid to make a circuit of the tower before descending to the next tower, a number of gas inlets surmounted by bubble cups arranged in circular series and a central bubble cup constructed and arranged to prevent the passage of liquid directly across the tray. The liquid is preferably caused to circulate around each tray in succession in the same direction throughout the series.

Reference will now be made to the accompanying drawing which illustrates by way of example a construction according to the invention and in which:—

Figure 1 is a plan showing the improved arrangement of tray employed,

Figure 2 is a cross sectional elevation taken on the line 2—2 of Figure 1,

Figure 3 is a cross sectional elevation taken on the line 3—3 of Fig. 1, and

Figure 4 is a plan showing the relative positions occupied by the inlets and outlets of a number of superimposed trays.

In the form illustrated a dephlegmating tower or fractionating column 1 has disposed therein a number of superimposed trays 2 which are supported on brackets 3 around their outer edges or in any other suitable manner. Each tray is formed with a number of tubular inlets 4 to permit gases ascending the tower or column to pass from the space beneath to the space above each tray and each of these inlets is covered by a cup or hood 5 which is removably mounted above and around the inlet 4 their relative dimensions being such that gas passing upwards through the inlet 4 is compelled to bubble through a liquid which is maintained at a constant level as hereinafter described above the base of each tray 2. The shape of the inlets and cups is shown in Fig. 1 wherein it will be seen that they are arranged in a number of concentric series the members of each series increasing in length towards the outer edge of the tray. This arrangement of the vapor inlets and superimposed caps provides a loci of vapor release proportionate to the oil flow and tends to substantially equalize the time of vapor liquid contact. The cups are supported by webs or feet (not shown) bearing on inlets 4 or upon the tray 2 and may be maintained in place by horizontal bars (not shown) which rest on the upper surfaces of the cups and are held in place by bolts passing through the tray 2 or other means for this purpose may be employed according to the type of tower.

Extending from the base of each tray is an outlet 6 for liquid which tapers in width towards its inner end as shown in plan in Fig. 1, this outlet terminating at its lower end in an opening shown in Fig. 3 below the level of liquid in the tray which is supplied. The outlet from each tray is over a weir 7, whose upper edge is below the level of the upper edges of the inlets 4 but above the lower edges of the cups 5 and 10. The outlets from successive trays are preferably arranged in advance one of the other as shown in Fig. 3 and so as to present in plan the radial arrangement shown in Fig. 4.

On the side of each outlet opposite to the weir 7 is disposed a relatively high baffle 8 which prevents any liquid escaping from the outlet 6 directly into the next succeeding outlet below it. Adjacent the open end of each outlet 6 is disposed a radial fin 9 extending upwards from the tray 2 to a height a little greater than that of the weir 7 the function of this fin being to prevent the entry of bubbles of gas upwardly into the outlet 6. The weir 7 and fin 9 meet the baffle 8 at its inner end as shown in Figure 1.

To prevent liquid taking a short path across the centre of the tray a special cup 10 is disposed at this point over a gas inlet 11 formed in a circular plate 12 detachably connected to the inner edge of the annular tray 2. The cup 10 in the form shown has four hollow arms 13 extending at right angles therefrom, these arms being closed at their outer ends but open on their under sides, their lower edges 14 being preferably serrated as shown in Fig. 2 to break up bubble formations. The cups 5 may be similarly formed for the same purpose. The cup 10 is also provided with baffles 15 extending at right angles the one to the other across the upper surfaces of the arms 13 these baffles serving to deflect the gas outwardly away from the centre of the tray.

In the form illustrated the bubble cups 5 are arranged in a plurality of concentric series so as to allow the liquid to flow around each tray 2 in a number of concentric circular paths between said series where the radial width of each path increases towards the circumference of the bubble tray permitting a flow in each path proportionate to the width thereof and tending to substantially equalize the time required for a complete circuit of the tray for concentric paths of varying radius. The members of one radial series of caps may be staggered in relation to adjacent series or otherwise arranged to compel the liquid to take a more irregular and longer course whilst still compelling it to complete a circuit of the plate before it passes to the next of the series. For these purposes also certain of the inner series of cups 5 may be formed or provided with fins 16 disposed radially of the tray 2 and engaging at their inner ends with the outer ends of the arms 13.

The centre bubble cups 10 can, if desired, be arranged to be removable either singly or with all the others in the series together with the plates 12 so as to leave after removal a hole sufficiently large to serve as a manhole.

The invention possesses the advantage that as the liquid under treatment travels in the same circular direction on each tray there is thus a practically constant temperature difference between each part of one tray and the corresponding parts of the trays immediately above and below it.

It is to be understood that the invention is not limited to the details of construction above described and illustrated. For example, in large towers the trays 2 may be built up in sections, each section containing one radial series of gas inlets and bubble cups whilst in small towers the plate 12 may form an integral part of the tray 2.

I claim:—

1. In a bubble tower for the fractionation of hydrocarbon oil vapors, a substantially circular bubble tray containing a series of concentric tubular inlets and superimposed caps through which oil vapors are adapted to pass, a central vapor inlet in said tray, a bubble cap overlying said central vapor inlet, said bubble cap having radially extending arms terminating in close proximity to bubble caps overlying the inner series of concentric tubular inlets, said last-mentioned bubble caps having lateral fins radially disposed and engaging with the outer ends of said arms.

2. In a bubble tower for the fractionation of hydrocarbon oil vapors, a substantially circular bubble tray containing a series of concentric tubular inlets and superimposed caps through which oil vapors are adapted to pass, a central vapor inlet in said tray, a bubble cap overlying said central vapor inlet, said bubble cap having radially extending arms, a triangular outlet radially disposed in said tray for conducting excess oil downwardly to a subjacent tray, one of the radial sides of said outlet being extended upwardly to form a baffle from a circumference of said tray to the outer end of one of said arms.

3. In a bubble tower for the fractionation of hydrocarbon oil vapors, a substantially circular bubble tray containing a series of concentric tubular inlets and superimposed caps through which oil vapors are adapted to pass, a central vapor inlet in said tray, a bubble cap overlying said central vapor inlet, said bubble cap having radially extending arms, a triangular outlet radially disposed in said tray for conducting excess oil downwardly to a subjacent tray, one of the radial sides of said outlet being extended upwardly to form a baffle from the circumference of said tray to the outer end of one of said arms, and a weir adjacent said outlet extending radially from the circumference of said tray to the outer end of said last-mentioned arm.

4. In a bubble tower for the fractionation of hydrocarbon oil vapors, a substantially circular bubble tray containing a series of concentric tubular inlets and superimposed caps through which oil vapors are adapted to pass, a central vapor inlet in said tray, a bubble cap overlying said central vapor inlet, said bubble cap having radially extending arms and vertical baffles superimposed thereon to deflect oil vapors outwardly away from the center of the tray, the tubular inlets and superimposed caps of each concentric series being progressively elongated toward the circumference of the bubble tray to permit passage of vapors in vertical ascent from any point below said bubble tray.

5. In a bubble tower for the fractionation of hydrocarbon oil vapors, a substantially circular bubble tray consisting of an annular member containing a series of concentric tubular inlets and superimposed caps through which oil vapors are adapted to pass, and a disc-like member removably positioned within the center of said annular member to form a continuous tray, said disc-like member containing a central vapor inlet, and a bubble cap superimposed thereon.

6. In a bubble tower for the fractionation of hydrocarbon oil vapors, a substantially cylindrical casing, a plurality of bubble trays superimposed vertically at spaced intervals within said casing, each of said trays containing a series of concentric tubular inlets and superimposed caps through which oil vapors are adapted to pass, the radial spacing of each concentric series of tubular inlets and superimposed caps from the adjacent series being increased toward the circumference of the bubble tray to substantially equalize the time of a complete circuit of said tray by oil flowing at any point thereon, an outlet in each of said trays for conducting excess oil downwardly to the adjacent lower tray, a baffle preceding said outlet in each tray, the outlets from successive trays being arranged in advance of the baffle on the adjacent lower tray to force the oil descending from tray to tray in said tower into a complete circuit in the same direction on each tray in said tower.

7. In a bubble tower for the fractionation of hydrocarbon oil vapors, a substantially cylindrical casing, a plurality of bubble trays superimposed vertically at spaced intervals within said casing, each of said trays containing a series of concentric tubular inlets and superimposed caps through which oil vapors are adapted to pass, the tubular inlets and superimposed caps of each concentric series being progressively elongated toward the circumference of the bubble tray to permit passage of vapors in vertical ascent from any point below said bubble tray, an outlet in each of said trays for conducting excess oil downwardly to the adjacent lower tray, a baffle preceding said outlet in each tray, the outlets from successive trays being arranged in advance of the baffle on the adjacent lower tray to force the oil descending from tray to tray in said tower into a complete circuit in the same direction on each tray in said tower.

8. In a bubble tower for the fractionation of hydrocarbon oil vapors, a substantially cylindrical casing, a plurality of bubble trays superimposed vertically at spaced intervals within said casing, each of said trays containing a series of concentric tubular inlets and superimposed caps through which oil vapors are adapted to pass, a central vapor inlet in each tray, a bubble cap overlying said central vapor inlet, said bubble cap having radially extending arms terminating in close proximity to bubble caps overlying the inner series of concentric tubular inlets to force the oil flowing on each tray into a completely circular path between concentric series of tubular inlets, an outlet in each of said trays for conducting excess oil downwardly to the adjacent lower tray, a baffle preceding said outlet in each tray, the outlets from successive trays being arranged in advance of the baffle on the adjacent lower tray to force the oil descending from tray to tray in said tower into a complete circuit in the same direction on each tray in said tower.

9. In a bubble tower for the fractionation of hydrocarbon oil vapors, a substantially circular bubble tray containing a series of concentric tubular inlets and a central tubular inlet fitted with superimposed caps through which oil vapors are adapted to pass, an oil inlet to said tray from a suprajacent tray, an oil outlet adjacent to and baffled from said oil inlet to a subjacent tray; said concentric tubular inlets being progressively elongated and disposed around said central tubular inlet to form a series of interjacent, concentric paths of increasing radial width towards the circumference of the bubble tray, said paths being adapted for the proportionate circumfluent flow of oil from said oil inlet to said oil outlet, tending to substantially equalize the time required for a complete circuit of the bubble tray.

10. In a bubble tower for the fractionation of hydrocarbon oil vapors, a substantially circular bubble tray containing a series of concentric inlets and a central tubular inlet fitted with superimposed caps through which oil vapors are adapted to pass, an oil inlet to said tray from a suprajacent tray, an oil outlet adjacent to and baffled from said oil inlet to a subjacent tray and adapted to carry a predetermined oil level in said bubble tray; said concentric tubular inlets and superimposed caps being progressively elongated and disposed around said central tubular inlet and superimposed cap to form a series of substantially concentric loci of increasing radial width towards the circumference of the bubble tray, said loci being adapted for the release of said oil vapors below said oil level in proportionate volumes to substantially equalize the vapor liquid contact time obtaining during a complete liquid circuit of the bubble tray.

11. In a bubble tower for the fractionation of hydrocarbon oil vapors, a substantially circular bubble tray containing a series of concentric tubular inlets fitted with superimposed caps through which oil vapors are adapted to pass, a triangular inlet radially disposed with respect to said tray for conducting oil onto said tray, a triangular outlet adjacent said inlet and radially disposed in said tray for conducting oil downwardly out of said tray, a baffle between said triangular inlet and said triangular outlet, the tubular inlets and superimposed caps of each concentric series being progressively elongated toward the circumference of said bubble tray tending to substantially equalize the time of vapor liquid contact.

12. In a bubble tower for the fractionation of hydrocarbon oil vapors, a substantially circular bubble tray containing a series of concentric tubular inlets fitted with superimposed caps through which oil vapors are adapted to pass, a triangular inlet radially disposed with respect to said tray for conducting oil onto said tray, a triangular outlet adjacent said inlet and radially disposed in said tray for conducting oil downwardly out of said tray, a baffle between said triangular inlet and said triangular outlet, each concentric series of tubular inlets and superimposed caps being progressively spaced from the adjacent series to form interjacent concentric paths of increasing radial width toward the circumference of said bubble tray tending to substantially equalize the time required for a complete circuit of said bubble tray by oil flowing from said inlet to said outlet on concentric paths of varying radius.

13. In a bubble tower for the fractionation of hydrocarbon oil vapors, a substantially circular bubble tray containing a series of concentric tubular inlets fitted with superimposed caps through which oil vapors are adapted to pass, a triangular inlet radially disposed with respect to said tray for conducting oil onto said tray, a triangular outlet adjacent said inlet and radially disposed in said tray for conducting oil downwardly out of said tray, a baffle between said triangular inlet and said triangular outlet, the tubular inlets and superimposed caps of each concentric series being progressively elongated toward the circumference of said bubble tray tending to substantially equalize the time of vapor liquid contact, and each concentric series of tubular inlets and superimposed caps being progressively spaced from the adjacent series to form interjacent concentric paths of increasing radial width toward the circumference of said bubble tray tending to substantially equalize the time required for a complete circuit of said bubble tray by oil flowing from said inlet to said outlet on concentric paths of varying radius.

In testimony whereof I have hereunto set my hand.

HAROLD MOORE.